(12) United States Patent
Honda (10) Patent No.: US 6,999,399 B2
(45) Date of Patent: Feb. 14, 2006

(54) OBJECTIVE LENS, OPTICAL PICKUP DEVICE, RECORDER AND REPRODUCER

(75) Inventor: Koji Honda, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 292 days.

(21) Appl. No.: 10/265,370

(22) Filed: Oct. 7, 2002

(65) Prior Publication Data
US 2003/0086354 A1 May 8, 2003

(30) Foreign Application Priority Data
Oct. 9, 2001 (JP) ............................. 2001-311851

(51) Int. Cl.
*G11B 7/135* (2006.01)

(52) U.S. Cl. .............................................. 369/112.08

(58) Field of Classification Search ............ 369/112.08, 369/112.26, 121, 118; 359/719
See application file for complete search history.

(56) References Cited

U.S. PATENT DOCUMENTS

| 5,889,748 | A  | * | 3/1999  | Shimano et al. | ....... | 369/112.26 |
| 6,192,021 | B1 | * | 2/2001  | Saito et al.   | ................ | 369/53.2 |
| 6,671,247 | B1 | * | 12/2003 | Arai et al.    | ............. | 369/112.01 |
| 6,785,215 | B1 | * | 8/2004  | Yamanouchi et al. | .. | 369/112.23 |
| 2001/0028626 | A1 | * | 10/2001 | Maruyama et al. | ......... | 369/121 |

FOREIGN PATENT DOCUMENTS

| JP | 9-54973  | 2/1997 |
| JP | 11-86319 | 3/1999 |
| JP | 11-96585 | 4/1999 |

OTHER PUBLICATIONS

Arai, Norikazu et al., "Optical pickup apparatus, recording/reproducing apparatus provided with the optical pickup apparatus, optical element, and information recording/reproducing method", 2001-8513, published (Jul. 19, 2001).

* cited by examiner

*Primary Examiner*—Brian E. Miller
*Assistant Examiner*—Peter Vincent Agustin
(74) *Attorney, Agent, or Firm*—Finnegan, Henderson, Farabow, Garrett & Dunner, L.L.P.

(57) ABSTRACT

It is to provide an objective lens for being provided in an optical pickup device for carrying out at least one of a record of information on at least two types of optical information storing media and a reproduction of information from the optical information storing media. In the optical pickup device comprising the first and second light sources, a third-order spherical aberration component of the wavefront aberration caused in a first region that a numerical aperture on the side of the optical information storing medium is not more than NA2 which is required for the record/reproduction, is over. When the standard deviation value of an absolute value thereof is WSA2rms·$\lambda$2, the inequality $0.015 \leq WSA2rms \leq 0.06$ is satisfied. The light transmitted in the second region that a numerical aperture on the side of the optical information storing medium is over NA2, becomes a flare light.

11 Claims, 5 Drawing Sheets

SPHERICAL ABERRATION(DVD) (mm)

FIG.3

$\lambda_1$=655nm
$t_1$=0.6mm

SPHERICAL ABERRATION(DVD) (mm)

FIG.7

$\lambda_1$=663nm
$t_1$=0.6mm

OBJECTIVE LENS, OPTICAL PICKUP DEVICE, RECORDER AND REPRODUCER

BACKGROUND OF THE INVENTION

1. Field of the Invention

The present invention relates to an objective lens, an optical pickup device for carrying out at least one of the record of information on a plurality of optical information storing media in which the transparent substrates have different thicknesses from each other and the reproduction of information from the optical information storing media by using a condensing optical system including the objective lens, a reproducer and a recorder.

2. Description of Related Art

In recent years, when a short wavelength red laser is practically used, a DVD which is a high density optical information storing medium (also referred to as "optical disk") having the same size as a CD (compact disk) and a high capacity is commercialized. In a recording/reproducing apparatus for DVD, a numerical aperture on an optical disk side of the objective lens is 0.6 to 0.65 when a semiconductor laser emitting a light having a wavelength of about 650 nm is used. The DVD has a track pitch of 0.74 $\mu$m and a shortest pit length of 0.4 $\mu$m. The DVD has a 4 or more times higher density than the CD having a track pitch of 1.6 $\mu$m and a shortest pit length of 0.83 $\mu$m. In the DVD, in order to suppress a comma aberration caused by inclining the optical disk to an optical axis, the thickness of the transparent substrate is 0.6 mm and is a half of the thickness of the transparent substrate of the CD (1.2 mm).

In addition to the CD and the DVD, optical disks having various standards in which the wavelengths of lights emitted from the light sources, the thicknesses of the transparent substrates and the like are different from each other, for example, CD-R, CD-RW (write once type of compact disk), VD (video disk), MD (mini disk), MO (magneto optical disk) and the like, are commercialized and popularized. Further, the semiconductor laser emitting a light having a shorter wavelength has been developed. A short wavelength blue light laser having an oscillation wavelength $\lambda$ of about 400 nm will be practically used. Because the wavelength becomes short, it is possible that the optical information storing medium has a higher capacity even though an objective lens having the same numerical aperture as the objective lens for DVD is used.

Further, a plurality of optical information storing media having the same size as CD which is the above-described former optical information storing medium, for example, CD-R enabling the record and the reproduction, DVD enhancing the recording density and the like, in which the thicknesses of the transparent substrates of the recording layers and the wavelengths of the laser lights for record and reproduction are different from each other, have been developed. For these optical information storing media, it is required to enable the record and the reproduction by using one optical pickup device. Therefore, each type of optical pickup device having a plurality of laser light sources corresponding to each working wavelength and condensing a light on a recording layer by using the same objective lens with each necessary numerical aperture is proposed (for example, Japanese Patent Application Publications No. Tokukai-hei 9-54973, No. Tokukai-hei 11-96585 and No. Tokukai-hei 11-86319 and the like).

Among them, in Japanese Patent Application Publication No. Tokukai-hei 9-54973, an optical system using a hologram optical element which utilizes a transmitted light having a wavelength of 635 nm (0th order diffracted light) and a −1st order diffracted light having a wavelength of 785 nm, and an optical system using a hologram optical element which utilizes a +1st order diffracted light having a wavelength of 635 nm and a transmitted light having a wavelength of 785 nm (0th order diffracted light) are disclosed. However, according to those hologram optical elements, because a difference between adjacent steps of the hologram is large, it is difficult to unite them with an objective lens.

In Japanese Patent Application Publication No. Tokukai-hei 11-96585, an objective lens in which three divided surfaces are provided on a refractive surface of the light source side, is disclosed. Further, an optical pickup device which utilizes a light flux passing through the first divided surface and the third divided surface when information is reproduced from the first optical disk and utilizes a light flux passing through the first divided surface and the second divided surface when information is reproduced from the second optical disk in which the thickness of the transparent substrate is different from that of the first optical disk, is disclosed. However, according to this objective lens, when information is reproduced from the optical disk having a thicker transparent substrate, for example, CD, a residual aberration becomes larger.

In United States Patent Application Publication No. 2001-8513 which was assigned to the same assignee as this application, an optical pickup device in which a spherical aberration is compensated for a plurality of light sources having different oscillation wavelengths from each other, by canceling the function of a diffractive surface and that of a refractive surface with the objective lens having a diffractive ring-shaped zone on the refractive surface, was proposed. In this case, when a wavelength of a light emitted from the light source having a shorter oscillation wavelength is changed, there is some possibility that the chromatic aberration is caused.

SUMMARY OF THE INVENTION

In order to solve the above-described problems, an object of the present invention is to provide an objective lens which can record information on at least two types of optical information storing media which have transparent substrates having different thicknesses from each other and the recording densities which are different from each other or can reproduce information from the above storing media, by using at least two types of light sources having oscillation wavelengths which are different from each other, and can reduce the chromatic aberration in case of the optical information storing medium having a thinner transparent substrate and reduce the residual aberration in case of the optical information storing medium having a thicker transparent substrate; an optical pickup device having a condensing optical system including the above objective lens; a recorder and a reproducer.

That is, in accordance with the first aspect of the present invention, an objective lens for being provided in an optical pickup device for carrying out at least one of a record of information on at least two types of optical information storing media and a reproduction of information from the optical information storing media, so as to face to each information recording layer of the optical information storing media; each optical information storing medium having a transparent substrate having a different thickness from the others and each optical information storing medium having a different recording density from the others; comprising:

a diffraction pattern which is provided on at least one surface of the objective lens;

wherein at least one of the record of the information on a first optical information storing medium having a transparent substrate having a thickness of t1, and the reproduction of the information from the first optical information storing medium is carried out by using at least an m-th order diffracted light of a first light flux having a wavelength of approximately $\lambda 1$, the m-th order diffracted light being caused by the diffraction pattern and the first light flux being emitted from a first light source of the optical pickup device, where m is an integer;

at least one of the record of the information on a second optical information storing medium having a transparent substrate having a thickness of t2, and the reproduction of the information from the second optical information storing medium is carried out by using at least an n-th order diffracted light of a second light flux having a wavelength of approximately $\lambda 2$, the n-th order diffracted light being caused by the diffraction pattern and the second light flux being emitted from a second light source of the optical pickup device, where $\lambda 2$ is more than $\lambda 1$, n is an integer except n=m=0, and t2 is more than t1;

a first numerical aperture of the objective lens on a side of the optical information storing medium is NA1, the first numerical aperture being required to record the information on the first optical information storing medium or to reproduce the information from the first optical information storing medium by using the first light flux emitted from the first light source;

a second numerical aperture of the objective lens on the side of the optical information storing medium is NA2 which is smaller than NA1, the second numerical aperture being required to record the information on the second optical information storing medium or to reproduce the information from the second optical information storing medium by using the second light flux emitted from the second light source;

a third-order spherical aberration component of the wavefront aberration caused by transmitting a light through the transparent substrate of the second optical information storing medium in a first region that a numerical aperture on the side of the optical information storing medium is approximately not more than NA2 among a light flux which is transmitted through the objective lens when the second light flux emitted from the second light source enters the objective lens, is over, and when a standard deviation value of an absolute value of the third-order spherical aberration component is WSA2rms·$\lambda 2$, the following formula is satisfied:

$$0.015 \leq WSA2rms \leq 0.06;$$

among the light flux which is transmitted through the objective lens when the second light flux emitted from the second light source enters the objective lens, a first spherical aberration curve obtained by transmitting the light through the transparent substrate of the second optical information storing medium in the first region that the numerical aperture on the side of the optical information storing medium is approximately not more than NA2, and a second spherical aberration curve obtained by transmitting a light through the transparent substrate of the second optical information storing medium in a second region that the numerical aperture on the side of the optical information storing medium is approximately more than NA2, are discontinuous; and a standard deviation value of a wavefront aberration caused by transmitting a light through the transparent substrate of the second optical information storing medium in a third region that the numerical aperture on the side of the optical information storing medium is approximately not more than NA1 among the light which is transmitted through the objective lens when the second light flux emitted from the second light source enters the objective lens, is not less than 0.1·$\lambda 2$.

Here, rms indicates that a certain value is a standard deviation value. WSA2rms is a dimensionless value which is obtained by dividing the standard deviation value WSA2rms·$\lambda 2$ of the third-order spherical aberration component of the wavefront aberration by the wavelength $\lambda 2$ of the light flux emitted from the second light source. The wavefront aberration is caused by transmitting the light through the transparent substrate of the second optical information storing medium in the first region that the numerical aperture on the side of the optical information storing medium is approximately not more than NA2 among the light which is transmitted through the objective lens when the second light flux emitted from the second light source enters the objective lens.

According to the above objective lens, it is possible to reduce the chromatic aberration even though the diffraction pattern is provided. Further, it is possible to reduce the spherical aberration in case of the second optical information storing medium having a thicker transparent substrate.

In recent years, in order to save the manufacturing cost by reducing the cost of the material, an optical disk (optical information storing medium) comprising a transparent substrate having a thickness which is the lowest one in a predetermined standard or which is lower than the lowest one is available. According to the above objective lens, when information is recorded on or reproduced from the second optical information storing medium having a comparatively thin transparent substrate with respect to the standard, it is possible to obtain the excellent image forming performance.

Further, among the light flux which is transmitted through the objective lens when the second light flux emitted from the second light source enters the objective lens, a first spherical aberration curve obtained by transmitting the light through the transparent substrate of the second optical information storing medium in the first region that the numerical aperture on the side of the optical information storing medium is approximately not more than NA2, and a second spherical aberration curve obtained by transmitting the light through the transparent substrate of the second optical information storing medium in a second region that the numerical aperture on the side of the optical information storing medium is approximately more than NA2, are discontinuous. Among the light flux which is transmitted through the objective lens when the second light flux emitted from the second light source enters the objective lens, the light which is transmitted in the second region that the numerical aperture on the side of the optical information storing medium is approximately more than NA2 becomes a flare light because the aberration is large. Therefore, among the light flux which is transmitted through the objective lens when the second light flux emitted from the second light source enters the objective lens, a light which is transmitted in the first region that the numerical aperture on the side of the optical information storing medium is approximately not more than NA2, is formed into a beam spot on the information recording layer. When information is recorded on or reproduced from the second optical information storing medium having a thick transparent substrate, it is possible to obtain the excellent image forming performance.

It is preferable that m is an integer except 0 and that n is equal to m. Further, it is preferable that the objective lens is a single lens and the diffraction pattern is provided on the single lens.

Preferably, when the information is recorded on the first optical information storing medium or is reproduced from the first optical information storing medium, a first magnification of the objective lens is M1;

when the information is recorded on the second optical information storing medium or is reproduced from the second optical information storing medium, a second magnification of the objective lens is M2; and M1 is approximately equal to M2.

Preferably, M1 and M2 are approximately 0. Thereby, the position of the light sources is easily adjusted. In the concrete, it is possible to use one photo-detector and to unite the first light source with the second light source.

A first distance between the objective lens and a first position that a ray which is transmitted nearest to an optical axis of the objective lens in the second region that the numerical aperture on the side of the optical information storing medium is approximately more than NA2, among the light flux which is transmitted through the objective lens when the second light flux emitted from the second light source enters the objective lens, is converged by transmitting the light through the transparent substrate of the second optical information storing medium, is not less than 5 μm longer than a second distance between the objective lens and a second position that the wavefront aberration becomes the smallest in the first region that the numerical aperture on the side of the optical information storing medium is not more than NA2, among the light flux which is transmitted through the objective lens when the second light flux emitted from the second light source enters the objective lens, when the light is transmitted through the transparent substrate of the second optical information storing medium. Thereby, the light which is transmitted in the second region that the numerical aperture on the side of the optical information storing medium is approximately more than NA2, among the light flux which is transmitted through the objective lens when the second light flux emitted from the second light source enters the objective lens, becomes a flare light. Therefore, a beam spot is not too focused by the objective lens. Further, because a limitation of the aperture is not required, the condensing optical system becomes simple.

A spherical aberration curve obtained by transmitting the light through the transparent substrate of the second optical information storing medium is discontinuous at the point that the numerical aperture is approximately NA2. The spherical aberration curve is divided into a first spherical aberration curve in which the numerical aperture is approximately not more than NA2 and a second spherical aberration curve in which the numerical aperture is approximately more than NA2. The light which is transmitted in the second region that the numerical aperture is approximately more than NA2, indicates the light corresponding to the second spherical aberration curve.

It is preferable that a first distance between the objective lens and a first position that a ray which is transmitted farthest from an optical axis of the objective lens among the light flux which is transmitted through the objective lens when the second light flux emitted from the second light source enters the objective lens, is converged by transmitting the light through the transparent substrate of the second optical information storing medium, is not less than 15 μm longer than a second distance between the objective lens and a second position that the wavefront aberration becomes the smallest in the first region that the numerical aperture on the side of the optical information storing medium is not more than NA2, among the light flux which is transmitted through the objective lens when the second light flux emitted from the second light source enters the objective lens, when the light is transmitted through the transparent substrate of the second optical information storing medium. When the difference in distance is not less than 15 μm, the aberration for the ray transmitted near the point that the numerical aperture is NA1, becomes large. Therefore, the beam spot is not too focused by the objective lens.

Preferably, the number of the ring-shaped zones of the diffraction pattern is from 5 to 30. The number of the ring-shaped zones can be reduced in comparison with the case that the spherical aberration is perfectly compensated by the diffraction. Therefore, the it is possible to easily produce the objective lens.

In accordance with the second aspect of the present invention, an optical pickup device comprising:

the above-described condensing optical system having the objective lens;

a first light source;

a second light source; and a photo-detector for receiving a reflected light when a light flux emitted from one of the first light source and the second light source is reflected by an optical information storing medium;

wherein information is recorded or reproduced by condensing the light flux emitted from one of the first light source and the second light source on an information recording layer through a transparent substrate of the optical information storing medium by using the condensing optical system; and at least one of a record of information on at least two types of optical information storing media and a reproduction of information from the optical information storing media is carried out, each optical information storing medium having the transparent substrate having a different thickness from the others and each optical information storing medium having a different recording density from the others.

In particular, when M1 and M2 are approximately 0, it is preferable to unite the first light source with the second light source. Further, it is preferable that the photo-detector is common to the first light source and the second light source.

In accordance with the third aspect of the present invention, a recorder comprises the above-described optical pickup device and records at least one of a sound and an image.

In accordance with the fourth aspect of the present invention, a reproducer comprises the above-described optical pickup device and reproduces at least one of a sound and an image.

The condensing optical system according to the present invention, is one or more sets of optical systems which can read the information on the optical information storing medium or reproduce the information from the optical information storing medium. The condensing optical system includes not only a whole optical system which can read or reproduce the information but also a part of the above-described whole optical system. The condensing optical system includes an objective lens.

As an optical information storing medium according to the present invention, the information storing media formed in a disk shape, such as each type of CD, for example, CD, CD-R, CD-RW, CD-Video, CD-ROM and the like, each type of DVD, for example, DVD, DVD-ROM, DVD-RAM, DVD-R, DVD-RW and the like, or MD are included. In general, the transparent substrate is provided on the information recording layer of the optical information storing medium.

The record of information on the optical information storing medium and the reproduction of information from the optical information medium are that the information is recorded on the information recording layer of the optical information storing medium and that the information recorded on the information recording layer is reproduced, respectively. The condensing optical system according to the present invention, may be used to carry out the record only or the reproduction only, or to carry out both the record and the reproduction. The condensing optical system may carry out the record for one optical information storing medium and carry out the reproduction for another optical information storing medium. Further, the condensing optical system may carry out the record or the reproduction for one optical information storing medium and carry out both the record and the reproduction for another optical information storing medium. In the specification, the reproduction includes that the information is only read out.

In the present invention, the first light source (wavelength $\lambda 1$) and the second light (wavelength $\lambda 2$) source emit lights. The wavelength $\lambda 1$ is longer than the wavelength $\lambda 2$. Further, there is a sufficient difference between the wavelengths $\lambda 1$ and $\lambda 2$. The difference between the wavelengths of the lights emitted from the first and second light sources is required for not only each type of the optical information storing medium and the difference in the recording density, but also the difference in the thickness of the transparent substrate of the information storing medium and the difference between the record and the reproduction.

The phrase "objective lens" has a narrow meaning of one lens having a condensing function and provided so as to face to the optical information storing medium in the position which is the closest to the optical information storing medium in the condition that the optical information storing medium is disposed in the optical pickup device. This phrase has a broad meaning of a lens group which is movable with the above lens at least in a direction of an optical axis by an actuator. The lens group refers to one or more lenses. The lens group includes a single lens. Therefore, in the specification, the phrase "numerical aperture NA on the optical information storing medium of the objective lens" refers to the numerical aperture NA of the lens surface arranged in the position which is the closest to the optical information storing medium. The numerical aperture NA is defined by limiting the light flux to be formed into a spot on the best image point with a part or an element having a focusing function, such as an aperture or a filter provided in the optical pickup device, the diffraction pattern provided on the optical element such as an objective lens, and the like.

The diffraction pattern is one having a function of condensing or diffusing the light flux with the diffraction by providing a relief on, for example, a surface of a lens. In case of one surface having a region that the diffraction occurs and a region that the diffraction does not occur, the diffraction pattern is a region that the diffraction occurs. The diffractive structure or the diffraction pattern is the region that the diffraction occurs. As a shape of the relief, for example, a plurality of ring-shaped zones which are formed into substantially concentric circles around the optical axis on the surface of the optical element, are known. Further, the plurality of ring-shaped zones have a sectional form in which each ring-shaped zone step has a shape of saw teeth on the cross section including the optical axis. The shape of the relief includes the above-described shape.

BRIEF DESCRIPTION OF THE DRAWINGS

The present invention will become more fully understood from the detailed description given hereinbelow and the accompanying drawings which are given by way of illustration only, and thus are not intended as a definition of the limits of the present invention, and wherein.

PREFERRED EMBODIMENT OF THE INVENTION

Figure 1:
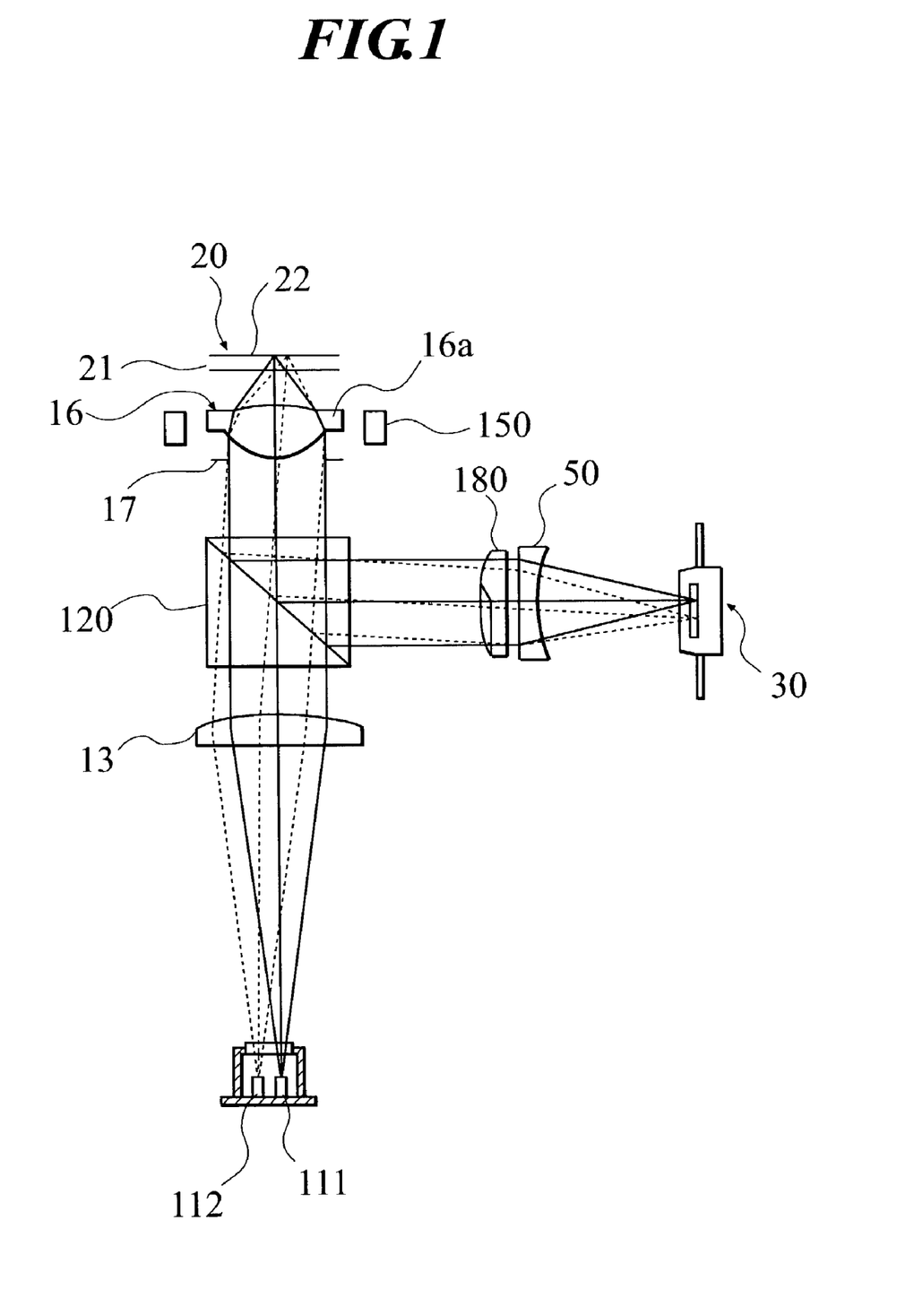
FIG. 1 is an optical path diagram showing the structure of the optical pickup device according to the present invention.

Hereinafter, an embodiment of the optical pickup device and the objective lens according the present invention will be explained with reference to the drawings. FIG. 1 is a view showing a schematic structure of the optical pickup device according to the embodiment.

The optical pickup device shown in FIG. 1, is constructed so as to read the information from each information recording layer of optical information storing media, for example, DVD (first optical information storing medium) and CD (second optical information storing medium) by using a light having a wavelength of about 650 nm ($\lambda 1$), which is emitted from the first light source and a light having a wavelength of about 780 nm ($\lambda 2$), which is emitted from the second light source.

As shown in FIG. 1, in the optical pickup device, the first semiconductor laser 111 for DVD, which emits a light having a wavelength of 650 nm and the second semiconductor laser 112 for CD, which emits a light having a wavelength of 780 nm are united as a light source. A beam splitter 120 is provided between a collimator 13 and an objective lens 16. A light which is approximately collimated by the collimator 13, passes through the beam splitter 120 and is directed to the objective lens 16. A light flux reflected by the information recording layer 22 of the optical disk (DVD or CD) 20 having a transparent substrate 21, is directed to a photo-detector 30 by the beam splitter 120 which is used as an optical path changing member.

The objective lens 16 comprises a flange portion 16a on a periphery thereof. The objective lens 16 can be easily attached to the optical pickup device by the flange portion 16a. Because the flange portion 16a has a surface extending to a direction perpendicular to the optical axis of the objective lens 16, it is possible to easily attach it more precisely.

When information is recorded on the DVD or is reproduced from the DVD, as shown by solid lines in FIG. 1, a light flux emitted from the first semiconductor laser 111 is transmitted through the collimator 13 and becomes a parallel light flux. The parallel light flux passes through the beam splitter 120 and is focused by the stop 17. Further, the light flux is condensed on the information recording layer 22 by the objective lens 16 through the transparent substrate 21 of the DVD 20. Then, the light flux is modulated by the information pit on the information recording layer 22 and is reflected. The reflected light flux passes through the objective lens 16 and the stop 17 and is reflected by the beam splitter 120. By the cylindrical lens 180, astigmatism is given to the light flux. Further, the light flux enters the photo-detector 30 through the concave lens 50. By using a signal outputted from the photo-detector 30, the reading signal of the information recorded on the DVD 20 can be obtained.

The change in the light amount, which is caused by the shape change and the position change of the spot on the photo-detector 30, is detected to carry out the focus detection and the track detection. In accordance with the result of the detections, the two-axis actuator 150 moves the objective lens 16 so as to form an image on the information recording layer 22 of the DVD 20 by condensing the light flux emitted from the first semiconductor laser 111. Further, the two-axis actuator 150 moves the objective lens 16 so as to form an image on a predetermined track by condensing the light flux emitted from the first semiconductor laser 111.

When information is recorded on the CD or is reproduced from the CD, as shown by broken lines in FIG. 1, a light flux emitted from the second semiconductor laser 112 is transmitted through the collimator 13 and becomes a parallel light flux. The parallel light flux passes through the beam splitter 120 and is focused by the stop 17. Further, the light flux is condensed on the information recording layer 22 by the objective lens 16 through the transparent substrate 21 of the CD 20. Then, the light flux is modulated by the information pit on the information recording layer 22 and is reflected. The reflected light flux passes through the objective lens 16 and the stop 17 and is reflected by the beam splitter 120. By the cylindrical lens 180, astigmatism is given to the light flux. Further, the light flux enters the photo-detector 30 through the concave lens 50. By using a signal outputted from the photo-detector 30, the reading signal of the information recorded on the CD 20 can be obtained.

The change in the light amount, which is caused by the shape change and the position change of the spot on the photo-detector 30, is detected to carry out the focus detection and the track detection. In accordance with the result of the detections, the two-axis actuator 150 moves the objective lens 16 so as to form an image on the information recording layer 22 of the CD 20 by condensing the light flux emitted from the second semiconductor laser 112. Further, the two-axis actuator 150 moves the objective lens 16 so as to form an image on a predetermined track by condensing the light flux emitted from the second semiconductor laser 112.

The objective lens 16 shown in FIG. 1 is a single lens on which a diffraction pattern is provided. The objective lens 16 is designed as follows. In the light flux which is emitted from the second semiconductor laser 112 and is transmitted through the objective lens 16, the third-order spherical aberration component of the wavefront aberration caused in the region that the numerical aperture on the CD side is not more than NA2, and caused by transmitting the light through the transparent substrate of the CD, is over (over-corrected). When the absolute value thereof is WSA2rms·λ2, the following formula is satisfied:

0.015 ≤ WSA2rms ≤ 0.06

The residual aberration exists within the above range.

Here, NA1 is a required numerical aperture on the DVD side, which is required to record information on the DVD or reproduce information from the DVD by using the light flux emitted from the first semiconductor laser 111.

NA2 is a required numerical aperture on the CD side, which is required to record information on the CD or reproduce information from the CD by using the light flux emitted from the second semiconductor laser 112.

Each diffracted light caused when each light flux emitted from the first semiconductor laser 111 and the second semiconductor laser 112 passes through the diffraction pattern, is the diffracted light having the same order except 0th order. The magnification M1 of the DVD side of the objective lens 16 in the record or the reproduction for the DVD, and the magnification M2 of the CD side of the objective lens 16 in the record or the reproduction for the CD are almost the same and are approximately 0. Therefore, in the optical pickup device shown in FIG. 1, only one photo-detector is sufficient to record or reproduce information. Further, it is possible to unite the first semiconductor laser 111 and the second semiconductor laser 112 in one part.

The optical pickup device shown in FIG. 1, can be provided in a recorder and a reproducer for at least one of a sound and an image, for example, a player or a drive which is compatible with an optical information recording medium, such as CD, CD-R, CD-RW, CD-Video, CD-ROM, DVD, DVD-ROM, DVD-RAM, DVD-R, DVD-RW, DVD+RW, MD or the like, or an AV apparatus, a personal computer or other information terminals into which the player or the drive is incorporated, or the like.

In the embodiment, the first optical information storing medium is DVD (light source wavelength: about 650 nm) and the second optical information storing medium is CD (light source wavelength: about 780 nm). However, the present invention is not limited to this.

For example, the first optical information storing medium may be a next generation high density optical disk (light source wavelength: about 400 nm) and the second optical information storing medium may be DVD (light source wavelength: about 650 nm) or the like.

Next, the above objective lens 16 will be explained. The condensing optical system according to the embodiment, is a single lens having aspherical surfaces on both surfaces. On one aspherical surface, diffraction ring-shaped zones (a diffractive surface formed in ring-shaped zones) are provided as a diffraction pattern.

That is, the refractive surface of the objective lens is formed in an aspherical surface form which is expressed by the following Equation (1).

$$Z = \frac{h^2/r}{1 + \sqrt{1 - (1+\kappa)(h/r)^2}} + \sum_{i=0}^{\infty} A_{2i} h^{2i} \qquad (1)$$

where Z is an axis in a direction of the optical axis (traveling direction of light is positive), h is an axis of a direction perpendicular to the optical axis, r is a paraxial curvature radius, κ is the constant of the cone and A is the aspherical coefficient.

Further, in general, the pitch of the diffraction ring-shaped zones is defined by using an phase difference function or an optical path difference function. In the concrete, the phase difference function $\phi b$ is expressed by the following equation (2) when the unit thereof is radian. The optical path difference function $\phi B$ is expressed by the following equation (3) when the unit thereof is mm.

$$\phi_b = \sum_{i=1}^{\infty} b_{2i} h^{2i} \quad (2)$$

$$\phi_B = \sum_{i=1}^{\infty} B_{2i} h^{2i} \quad (3)$$

In these two ways of the expressions for the pitch of the diffraction ring-shaped zones, although the units are different from each other, the equations are the same in respect of the expression for the pitch of the diffraction ring-shaped zones. That is, when the blazed wavelength is $\lambda$ (mm), the coefficient B of the optical path difference function is obtained by multiplying the coefficient b of the phase difference function into $\lambda/2\pi$. On the other hand, the coefficient b of the phase difference function is obtained by multiplying the coefficient B of the optical path difference function into $2\pi/\lambda$.

Next, as a concrete example of the objective lens according to the embodiment, Examples 1 and 2 will be explained. The objective lens according to each example is a single lens.

EXAMPLE 1

The objective lens according to Example 1 has a focal length f of 3.05 mm when the light flux having the first reference wavelength $\lambda 1$ of 655 nm enters, and has a focal length f of 3.07 mm when the light flux having the second reference wavelength $\lambda 2$ of 785 nm enters. One focal length is approximately equal to the other. When the first reference wavelength $\lambda 1$ is 655 nm, the numerical aperture NA1 is 0.600 and the thickness t1 of the transparent substrate of the DVD is 0.6 mm, the objective lens has a sufficient image forming performance. Further, when second reference wavelength $\lambda 2$ is 785 nm, the numerical aperture NA1 is 0.463 and the thickness t2 of the transparent substrate of the CD is 1.2 mm, the objective lens has a sufficient image forming performance. In case of the first reference wavelength $\lambda 1$ and the thickness t1 of the transparent substrate of the DVD, an aberration is hardly caused. In case of the second reference wavelength $\lambda 2$ and the thickness t2 of the transparent substrate of the CD, the spherical aberration remains in an over direction within the region that the numerical aperture is not more than NA2. Hereinafter, the phase "image-side" means the side of the optical information storing medium.

Table 1 shows the lens data of Example 1. In the following Tables 1 and 2, for example, the expression "2.2E–02" indicates "$2.2 \times 10^{-2}$".

TABLE 1

| Example 1 | | |
| --- | --- | --- |
| Wavelength $\lambda$ (nm) | 655 | 785 |
| Focal length f (mm) | 3.05 | 3.07 |
| Image-side predetermined numerical aperture NA | 0.600 | 0.463 |

TABLE 1-continued

| Example 1 | | | | |
| --- | --- | --- | --- | --- |
| i | ri | dli | d2i | Material |
| 0 | ∞ | ∞ | ∞ | |
| 1 | | 1.720 | 1.720 | olefin resin |
| 2 | −8.5178 | 1.701 | 1.336 | |
| 3 | ∞ | 0.600 | 1.200 | PC |
| 4 | ∞ | | | |

Index "1" expresses $\lambda = 655$ nm,
Index "2" expresses $\lambda = 785$ nm.

| First surface (boundary hb = 1.421) | |
| --- | --- |
| First region (0 ≦ h < hb) | |
| r | 1.9012E+00 |
| Coefficient of optical path difference function (blazed wavelength = 1 mm) | |
| $B_4$ | −1.7804E+00 |
| $B_6$ | −9.2275E−02 |
| $B_8$ | −1.1206E−01 |
| $B_{10}$ | −3.5211E−03 |
| Aspherical coefficient | |
| κ | −2.0413E+00 |
| $A_4$ | 2.6828E−02 |
| $A_6$ | −2.2149E−03 |
| $A_8$ | −1.6086E−04 |
| $A_{10}$ | 2.1158E−04 |
| $A_{12}$ | −1.0123E−04 |
| $A_{14}$ | 1.5562E−05 |
| Second region (h ≧ hb) | |
| r | 2.0334E+00 |
| Coefficient of optical path difference function (blazed wavelength = 1 mm) | |
| $B_2$ | −8.4762E−01 |
| $B_4$ | −1.1803E+00 |
| $B_6$ | −7.5634E−01 |
| $B_8$ | 2.7029E−01 |
| $B_{10}$ | −2.2113E−02 |
| Aspherical coefficient | |
| κ | −1.5952E−01 |
| $A_0$ | 7.9600E−03 |
| $A_4$ | 7.8575E−03 |
| $A_6$ | −5.5357E−03 |
| $A_8$ | 8.1019E−04 |
| $A_{10}$ | −4.2001E−04 |
| $A_{12}$ | 1.5062E−04 |
| $A_{14}$ | −2.2071E−05 |
| Second surface | |
| Aspherical coefficient | |
| κ | 4.8286E+00 |
| $A_4$ | 2.1720E−02 |
| $A_6$ | −9.4292E−03 |
| $A_8$ | 3.0299E−03 |
| $A_{10}$ | −5.3727E−04 |
| $A_{12}$ | 3.7404E−05 |
| $A_{14}$ | −6.5758E−07 |

Figure 2:
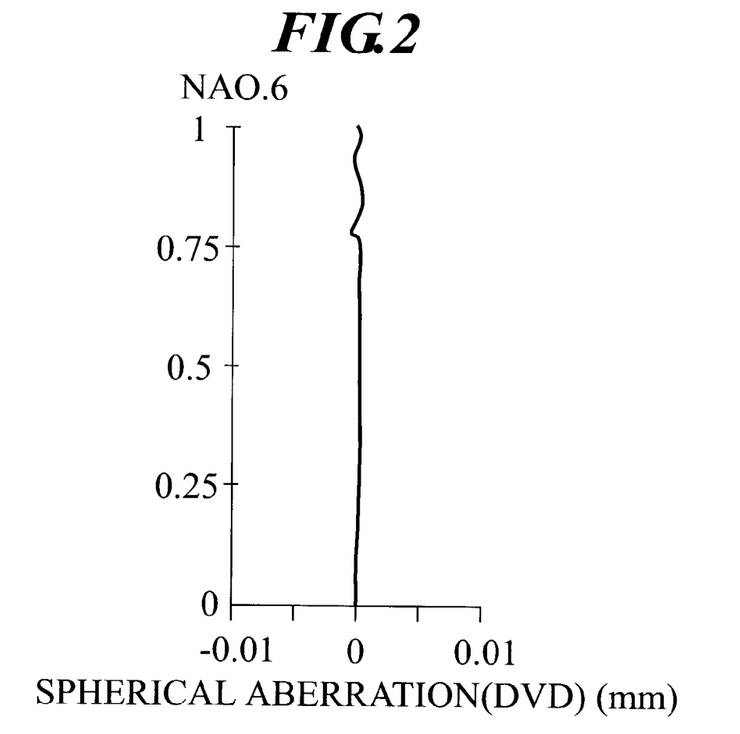
FIG. 2 is a longitudinal spherical aberration diagram of the objective lens according to Example 1 of the embodiment in case of the first reference wavelength $\lambda 1$ of 655 nm.
Figure 3:
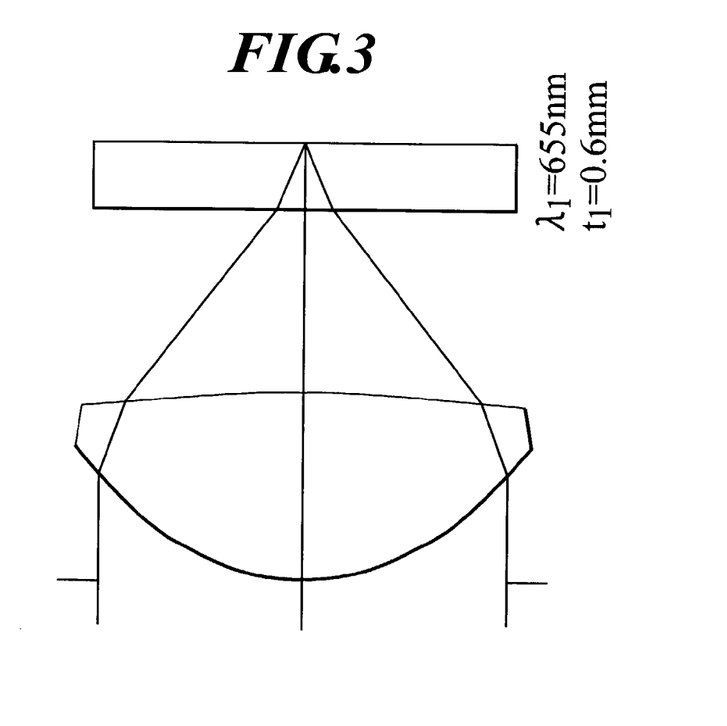
FIG. 3 is an optical path diagram of the objective lens according to Example 1 in case of FIG. 2.

FIG. 2 is a longitudinal spherical aberration diagram of the objective lens according to Example 1 in case of the first reference wavelength $\lambda 1$ of 655 nm and the thickness t1 of the transparent substrate of the DVD is 0.6 mm. FIG. 3 is an optical path diagram of the objective lens according to Example 1 in this case.

As shown in FIG. 2, in case of the first reference wavelength λ1, the spherical aberration is sufficiently compensated.

Figure 4:
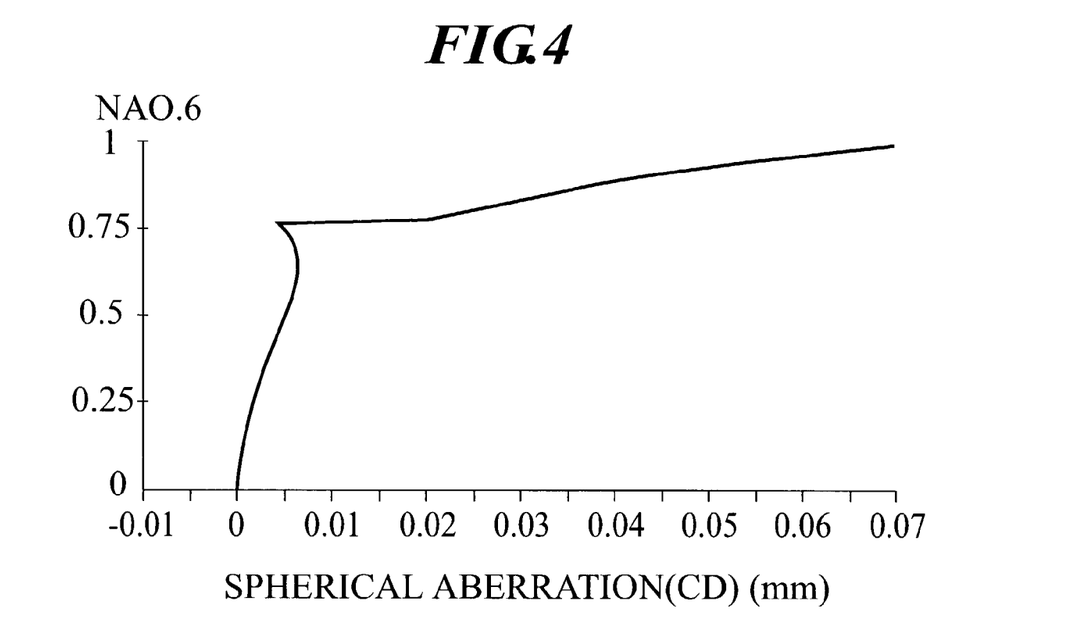
FIG. 4 is a longitudinal spherical aberration diagram of the objective lens according to Example 1 in case of the second reference wavelength $\lambda 2$ of 785 nm.
Figure 5:
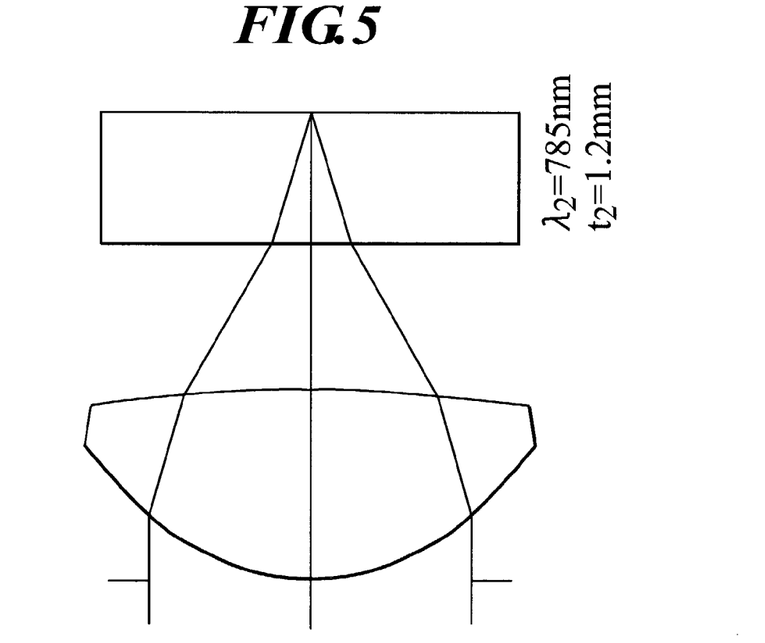
FIG. 5 is an optical path diagram of the objective lens according to Example 1 in case of FIG. 4.

FIG. 4 is a longitudinal spherical aberration diagram of the objective lens according to Example 1 in case of the second reference wavelength λ2 of 785 nm and the thickness t2 of the transparent substrate of the CD is 1.2 mm. FIG. 5 is an optical path diagram of the objective lens according to Example 1 in this case.

As shown in FIG. 4, in case of the second reference wavelength λ2, the spherical aberration is over within the region that the numerical aperture is small (the region that the image-side numerical aperture NA is not more than NA2=0.463). The standard deviation value of the third-order spherical aberration component of the wavefront aberration is 0.017·λ2.

Further, the first surface of the objective lens is divided into the first region and the second region. In case of the second reference wavelength λ2, a discontinuous point of the spherical aberration is provided. When the discontinuous point is a boundary between the first region and the second region, a beam spot is formed on the information recording layer 22 by using the light flux which is transmitted through the first region (the region that the image-side numerical aperture NA is not more than NA2=0.463). Further, the light flux which is transmitted through the second region (the region that the image-side numerical aperture NA is over NA2=0.463), becomes a flare light. Therefore, the excellent image forming performance can be obtained.

EXAMPLE 2

The objective lens according to Example 2 has a focal length f of 3.36 mm when the light flux having the first reference wavelength λ1 of 663 nm enters, and has a focal length f of 3.38 mm when the light flux having the second reference wavelength λ2 of 788 nm enters. One focal length is approximately equal to the other. When the first reference wavelength λ1 is 663 nm, the numerical aperture NA1 is 0.600 and the thickness t1 of the transparent substrate of the DVD is 0.6 mm, the objective lens has a sufficient image forming performance. Further, when second reference wavelength λ2 is 788 nm, the numerical aperture NA1 is 0.455 and the thickness t2 of the transparent substrate of the CD is 1.2 mm, the objective lens has a sufficient image forming performance. In case of the first reference wavelength λ1 and the thickness t1 of the transparent substrate, an aberration is hardly caused. In case of the second reference wavelength λ2 and the thickness t2 of the transparent substrate, the spherical aberration remains in an over direction within the region that the numerical aperture is not more than NA2. The standard deviation value of the third-order spherical aberration component of the wavefront aberration is 0.058·λ2.

Table 2 shows the lens data of Example 2.

TABLE 2

Example 2

| Wavelength λ (nm) | | | 663 | 788 |
|---|---|---|---|---|
| Focal length f (mm) | | | 3.36 | 3.38 |
| Image-side predetermined numerical aperture NA | | | 0.600 | 0.455 |
| i | ri | dli | d2i | Material |
| 0 | ∞ | ∞ | ∞ | |
| 1 | | 2.200 | 2.200 | olefin resin |
| 2 | −8.1329 | 1.754 | 1.389 | |
| 3 | ∞ | 0.600 | 1.200 | PC |
| 4 | ∞ | | | |

Index "1" expresses λ=663 nm,
Index "2" expresses λ=788 nm.

| First surface (boundary hb = 1.538) | |
|---|---|
| First region (0 ≤ h < hb) | |
| r | 2.1170E+00 |
| Coefficient of optical path difference function (blazed wavelength = 1 mm) | |
| $B_4$ | −1.2297E+00 |
| $B_6$ | 2.2354E−01 |
| $B_8$ | −1.4743E−01 |
| $B_{10}$ | 2.0764E−02 |
| Aspherical coefficient | |
| κ | −1.2335E+00 |
| $A_4$ | 9.2347E−03 |
| $A_6$ | 1.9413E−04 |
| $A_8$ | −2.0001E−04 |
| $A_{10}$ | 3.0036E−05 |
| Second region (h ≥ hb) | |
| r | 2.0486E+00 |
| Coefficient of optical path difference function (blazed wavelength = 1 mm) | |
| $B_2$ | 6.1716E+00 |
| $B_4$ | −1.0351E+01 |
| $B_6$ | 4.3944E+00 |
| $B_8$ | −8.3342E−01 |
| $B_{10}$ | 5.7363E−02 |
| Aspherical coefficient | |
| κ | −8.9030E−01 |
| $A_4$ | −5.5381E−03 |
| $A_6$ | 3.3525E−03 |
| $A_8$ | 1.7598E−04 |
| $A_{10}$ | −2.8058E−04 |
| $A_{12}$ | 5.5041E−05 |
| $A_{14}$ | −3.8452E−06 |
| Second surface | |
| Aspherical coefficient | |
| κ | 4.4287E+00 |
| $A_4$ | 2.3035E−02 |
| $A_6$ | −1.2813E−02 |
| $A_8$ | 6.1881E−03 |
| $A_{10}$ | −1.9057E−03 |
| $A_{12}$ | 3.1979E−04 |
| $A_{14}$ | −2.2721E−05 |

Figure 6:
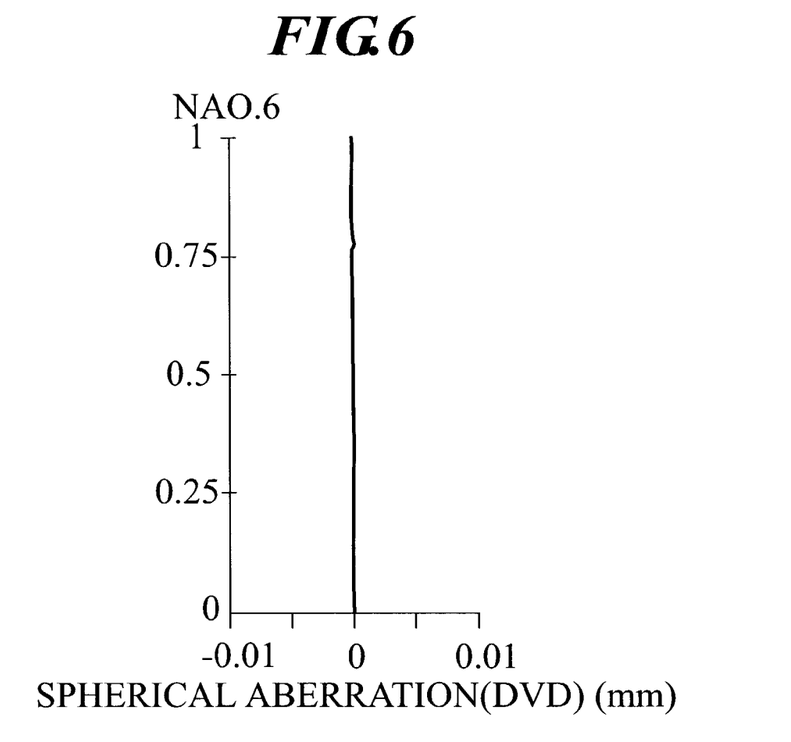
FIG. 6 is a longitudinal spherical aberration diagram of the objective lens according to Example 2 of the embodiment in case of the first reference wavelength $\lambda 1$ of 663 nm.
Figure 7:
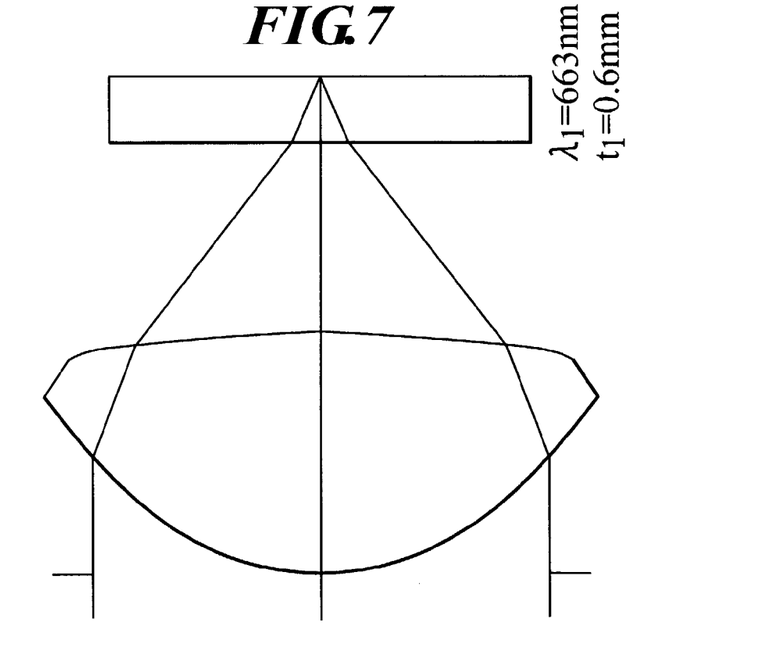
FIG. 7 is an optical path diagram of the objective lens according to Example 2 in case of FIG. 6.

FIG. 6 is a spherical aberration diagram of the objective lens according to Example 2 in case of the first reference wavelength λ1 of 663 nm and the thickness t1 of the transparent substrate of the DVD is 0.6 mm. FIG. 7 is an optical path diagram of the objective lens according to Example 2 in this case.

As shown in FIG. 6, in case of the first reference wavelength λ1, the spherical aberration is sufficiently compensated.

Figure 8:
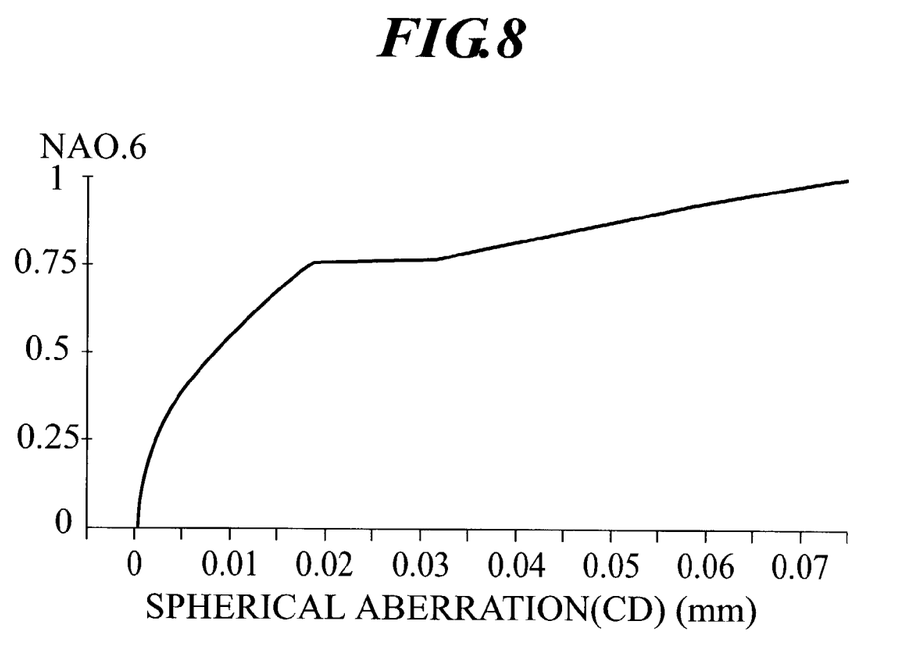
FIG. 8 is a longitudinal spherical aberration diagram of the objective lens according to Example 2 in case of the second reference wavelength $\lambda 2$ of 788 nm.
Figure 9:
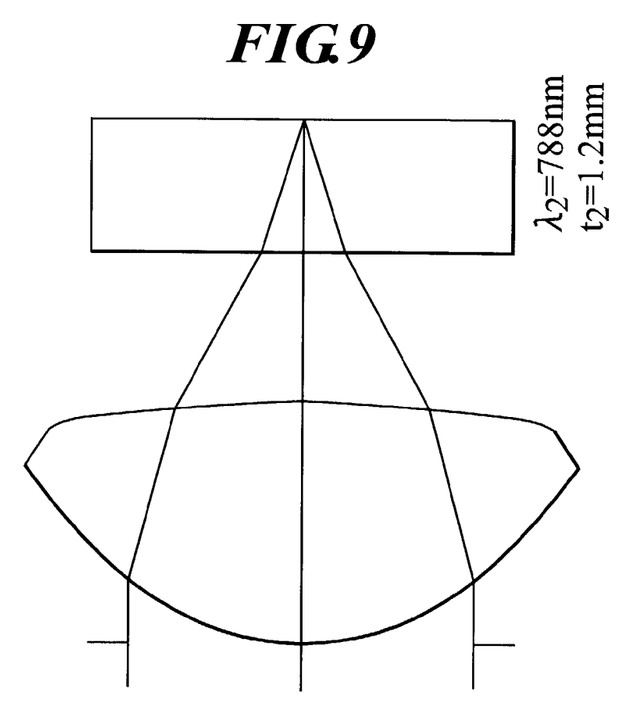
FIG. 9 is an optical path diagram of the objective lens according to Example 2 in case of FIG. 8.

FIG. 8 is a spherical aberration diagram of the objective lens according to Example 2 in case of the second reference wavelength λ2 of 788 nm and the thickness t2 of the transparent substrate of the CD is 1.2 mm. FIG. 9 is an optical path diagram of the objective lens according to Example 2 in this case.

As shown in FIG. 8, in case of the second reference wavelength λ2, the spherical aberration is sufficiently compensated within the region that the numerical aperture is not more than NA2.

Further, the first surface of the objective lens is divided into the first region and the second region. In case of the second reference wavelength λ2, a discontinuous point of the spherical aberration is provided. When the discontinuous point is a boundary between the first region and the second region, a beam spot is formed on the information recording layer 22 by using the light flux which is transmitted through the first region (the region that the image-side numerical aperture NA is not more than NA2=0.455). Further, the light flux which is transmitted through the second region (the region that the image-side numerical aperture NA is over NA2=0.455), becomes a flare light. Therefore, the excellent image forming performance can be obtained.

As described above, olefin resin is used as a material of the objective lens according to Examples 1 and 2. Polycarbonate resin (PC) is used as a material of the transparent substrate for DVD and CD. Each refractive index of these materials is shown in Table 3 in case of each reference wavelength.

TABLE 3

| Refractive index | | | | |
|---|---|---|---|---|
| Wavelength | 655 nm | 663 nm | 785 nm | 788 nm |
| Olefin resin | 1.54094 | 1.540651 | 1.53716 | 1.53709 |
| PC | 1.57752 | 1.576982 | 1.57063 | 1.570506 |

Next, a plurality of ring-shaped zones which are provided on the objective lens according to Example 2, will be explained.

The ring-shaped zones are formed into substantially concentric circles around the optical axis on the lens surface. With respect to Example 2 and the comparative example in which the residual aberration does not exist in the objective lens, the pitch PF of the ring-shaped zones, which is on a circle corresponds to the maximum numerical aperture on the image-side of the lens, and the pitch PH of the ring-shaped zones, which is on a circle corresponding to the half of the maximum numerical aperture, are shown as follows.

| Example 2 | |
|---|---|
| First ring-shaped zone: | 969.4 μm |
| Minimum pitch: | 43.7 μm |
| PH: | 180.6 μm |
| PF: | 43.7 μm |
| Number of ring-shaped zones: | 15 |
| Comparative example | |
| First ring-shaped zone: | 850.2 μm |
| Minimum pitch: | 11.5 μm |
| PH: | 55.6 μm |
| PF: | 11.5 μm |
| Number of ring-shaped zones: | 38 |

As described above, in the example, because the number of the ring-shaped zones can be reduced in comparison with the objective lens according to the comparative example, in which the residual aberration does not exist, the diffraction pattern of the lens can be easily formed. Further, the manufacturing cost of the lens can be reduced.

According to the present invention, it is possible to provide an objective lens which can record information on at least two types of optical information storing media which have transparent substrates having different thicknesses from each other or can reproduce information from the above storing media, by using at least two light sources having oscillation wavelengths which are different from each other, and can reduce the chromatic aberration in case of the optical information storing medium having a thinner transparent substrate and reduce the residual aberration in case of the optical information storing medium having a thicker transparent substrate; an optical pickup device having a condensing optical system including the above objective lens; a recorder and a reproducer.

Among the light flux which is transmitted through the objective lens when the light is emitted from the second light source and enter the condensing optical system, the light flux which is transmitted in the region that the numerical aperture on the optical information storing medium is over NA2, becomes a flare light. Therefore, by the region that the numerical aperture is approximately not more than NA2, the beam spot is formed on the information recording layer 22. It is possible to obtain an excellent image forming performance when the information is recorded on the second information storing medium having a thicker transparent substrate and is reproduced from the second information storing medium.

The entire disclosure of Japanese Patent Application No. Tokugan 2001-311851 filed on Oct. 9, 2001 including specification, claims drawings and summary are incorporated herein by reference in its entirety.

What is claimed is:

1. An objective lens for being provided in an optical pickup device for carrying out at least one of a record of information on at least two types of optical information storing media and a reproduction of information from the optical information storing media, so as to face to each information recording layer of the optical information storing media; each optical information storing medium having a transparent substrate having a different thickness from the others and each optical information storing medium having a different recording density from the others; comprising:

a diffraction pattern which is provided on at least one surface of the objective lens;

wherein at least one of the record of the information on a first optical information storing medium having a transparent substrate having a thickness of t1, and the reproduction of the information from the first optical information storing medium is carried out by using at least an m-th order diffracted light of a first light flux having a wavelength of approximately λ1, the m-th order diffracted light being caused by the diffraction pattern and the first light flux being emitted from a first light source of the optical pickup device, where m is an integer;

at least one of the record of the information on a second optical information storing medium having a transparent substrate having a thickness of t2, and the reproduction of the information from the second optical information storing medium is carried out by using at least an n-th order diffracted light of a second light flux having a wavelength of approximately λ2, the n-th order diffracted light being caused by the diffraction pattern and the second light flux being emitted from a second light source of the optical pickup device, where λ2 is more than λ1, n is an integer except n=m=0, and t2 is more than t1;

a first numerical aperture of the objective lens on a side of the optical information storing medium is NA1, the first numerical aperture being required to record the information on the first optical information storing medium or to reproduce the information from the first optical information storing medium by using the first light flux emitted from the first light source;

a second numerical aperture of the objective lens on the side of the optical information storing medium is NA2 which is smaller than NA1, the second numerical aperture being required to record the information on the second optical information storing medium or to reproduce the information from the second optical information storing medium by using the second light flux emitted from the second light source;

a third-order spherical aberration component of the wavefront aberration caused by transmitting a light through the transparent substrate of the second optical information storing medium in a first region that a numerical aperture on the side of the optical information storing medium is approximately not more than NA2 among a light flux which is transmitted through the objective lens when the second light flux emitted from the second light source enters the objective lens, is over, and when a standard deviation value of an absolute value of the third-order spherical aberration component is WSA2rmsλ2, the following formula is satisfied:

0.015≦WSA2rms≦0.06;

wherein the objective lens includes an optical surface, which consists of a first region and a second region outside the first region, the first region corresponding to a region having a numerical aperture approximately not more than the second numerical aperture NA2, the second region corresponding to a region having a numerical aperture approximately more than the second numerical aperture NA2, and the boundary between the first region and the second region being discontinuous, wherein when the second light flux emitted from the second light source enters the objective lens, the boundary between a first spherical aberration curve and a second spherical aberration curve is discontinuous, and each of the first spherical aberration curve and the second spherical aberration curve are continuous, where the first spherical aberration curve is obtained by transmitting the first or second light flux through the first region and the transparent substrate of the first or second optical information storing medium, and the second spherical aberration curve is obtained by transmitting the first or second light flux through the second region and the transparent substrate of the first or second optical information storing medium, a standard deviation value of a wavefront aberration caused by transmitting a light through the transparent substrate of the second optical information storing medium in a region that the numerical aperture on the side of the optical information storing medium is approximately not more than NA1 and more than NA2 among the light flux which is transmitted through the objective lens when the second light flux emitted from the second light source enters the objective lens, is not less than 0.1λ2.

2. The objective lens of claim 1, wherein m is an integer except 0 and n is equal to m.

3. The objective lens of claim 1, wherein the objective lens is a single lens and the diffraction pattern is provided on the single lens.

4. The objective lens of claim 1, wherein when the information is recorded on the first optical information storing medium or is reproduced from the first optical information storing medium, a first magnification of the objective lens is M1;

when the information is recorded on the second optical information storing medium or is reproduced from the second optical information storing medium, a second magnification of the objective lens is M2; and M1 is approximately equal to M2.

5. The objective lens of claim 4, wherein M1 and M2 are approximately 0.

6. The objective lens of claim 1, wherein a first distance between the objective lens and a first position that a ray which is transmitted nearest to an optical axis of the objective lens in the second region that the numerical aperture on the side of the optical information storing medium is approximately more than NA2, among the light flux which is transmitted through the objective lens when the second light flux emitted from the second light source enters the objective lens, is converged by transmitting the light through the transparent substrate of the second optical information storing medium, is not less than 5 μm longer than a second distance between the objective lens and a second position that the wavefront aberration becomes the smallest in the first region that the numerical aperture on the side of the optical information storing medium is not more than NA2, among the light flux which is transmitted through the objective lens when the second light flux emitted from the second light source enters the objective lens, when the light is transmitted through the transparent substrate of the second optical information storing medium.

7. The objective lens of claim 1, wherein a first distance between the objective lens and a first position that a ray which is transmitted farthest from an optical axis of the objective lens among the light flux which is transmitted through the objective lens when the second light flux emitted from the second light source enters the objective lens, is converged by transmitting the light through the transparent substrate of the second optical information storing medium, is not less than 15 μm longer than a second distance between the objective lens and a second position that the wavefront aberration becomes the smallest in the first region that the numerical aperture on the side of the optical information storing medium is not more than NA2, among the light flux which is transmitted through the objective lens when the second light flux emitted from the second light source enters the objective lens, when the light is transmitted through the transparent substrate of the second optical information storing medium.

8. An optical pickup device comprising:

a condensing optical system having the objective lens of claim 1;

a first light source;

a second light source; and a photo-detector for receiving a reflected light when a light flux emitted from one of the first light source and the second light source is reflected by an optical information storing medium;

wherein information is recorded or reproduced by condensing the light flux emitted from one of the first light source and the second light source on an information recording layer through a transparent substrate of the optical information storing medium by using the condensing optical system; and at least one of a record of information on at least two types of optical information storing media and a reproduction of information from the optical information storing media is carried out, each optical information storing medium having the transparent substrate having a different thickness from the others and each optical information storing medium having a different recording density from the others.

9. The optical pickup device of claim 8, wherein the first light source and the second light source are united with each other, and the photo-detector is common to the first light source and the second light source.

10. A recorder for recording at least one of a sound and an image, comprising the optical pickup device of claim 8.

11. A reproducer for reproducing at least one of a sound and an image, comprising the optical pickup device of claim 8.

* * * * *